Figures 1, 2:
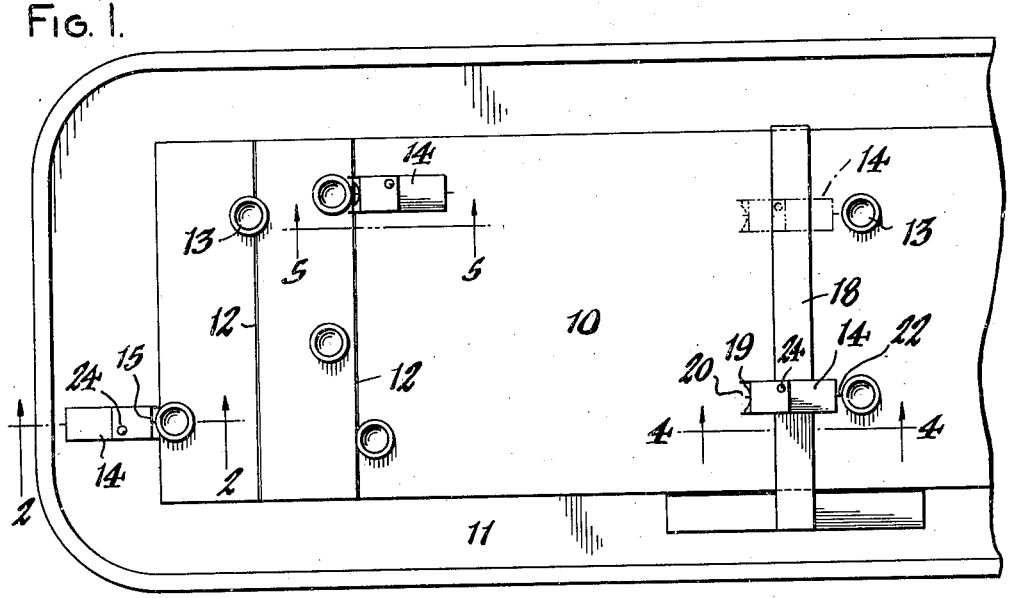

Feb. 21, 1950 M. J. HARBECK 2,498,547
SHUFFLEBOARD WEIGHT POSITION INDICATOR
Filed May 10, 1948 2 Sheets-Sheet 1

INVENTOR,
Merle J. Harbeck,
BY Walter P. Fryer
ATTORNEY.

Feb. 21, 1950 M. J. HARBECK 2,498,547
SHUFFLEBOARD WEIGHT POSITION INDICATOR
Filed May 10, 1948 2 Sheets-Sheet 2
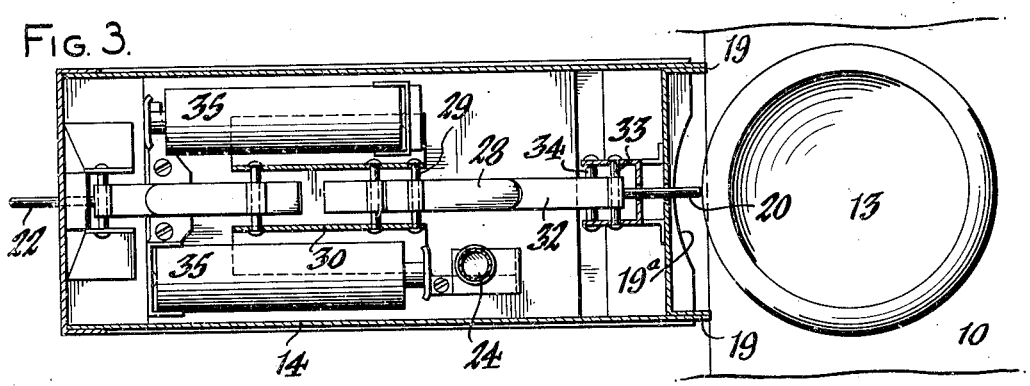
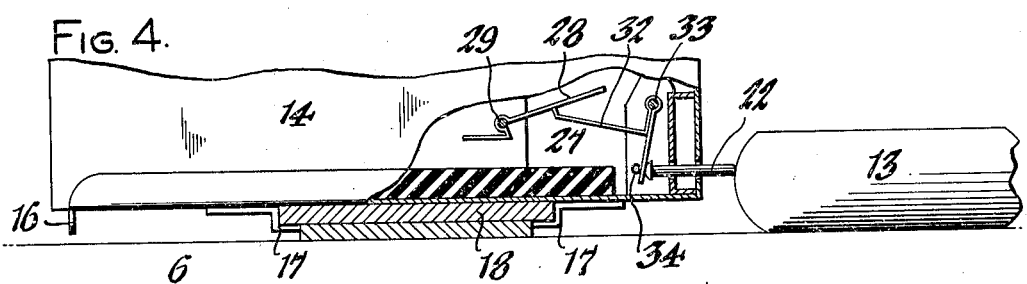
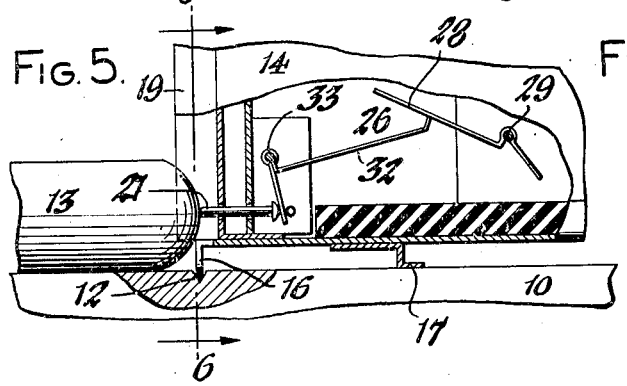
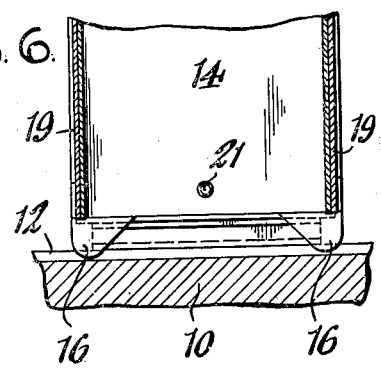
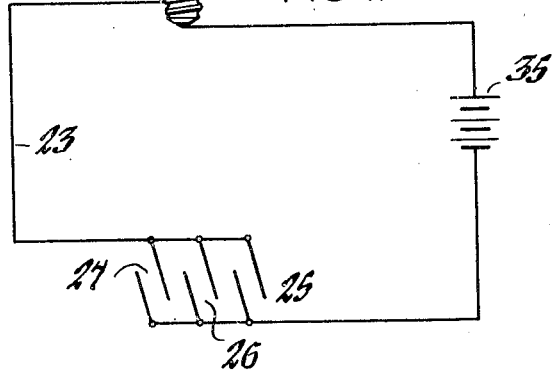
INVENTOR,
Merle J. Harbeck,
BY
ATTORNEY Patented Feb. 21, 1950

2,498,547

UNITED STATES PATENT OFFICE 2,498,547

SHUFFLEBOARD WEIGHT POSITION INDICATOR

Merle J. Harbeck, Buffalo, N. Y.

Application May 10, 1948, Serial No. 26,207

6 Claims. (Cl. 177—311)

This invention relates generally to the game known as shuffle-board, but more particularly to a novel device or instrument for indicating the position of a given counter or weight relative to another weight or to one or another of the zone lines on the playing board.

It has for one of its objects to provide an instrument of this character which is so designed and constructed as to effectually and positively indicate or register disputed positions of the playing pieces or weights on the board, such as whether a weight is short of being over a given line, whether one weight or another of several weights is the leading one, or whether a weight is actually hanging over the end of the playing board.

Another object of the invention is to provide a portable shuffle-board weight indicator which is not only simple, compact and inexpensive in construction, but which is sensitive yet positive and reliable in operation, and which is readily adjustable to adapt it to any clearance that the playing teams may determine as necessary and wherein its accuracy of performance will eliminate any question of weight-position where the eye alone is not sufficient to determine it.

Other features of the invention reside in the construction and arrangement of parts hereinafter described and particularly pointed out in the appended claims.

In the accompanying drawings:

Figure 1 is a fragmentary top plan view of a shuffle-board showing my indicator in different testing positions thereon. Figure 2 is an enlarged fragmentary longitudinal section taken on line 2—2, Figure 1. Figure 3 is a horizontal section taken on line 3—3, Figure 2. Figure 4 is a fragmentary longitudinal section taken substantially in the plane of line 4—4, Figure 1. Figure 5 is a similar section taken substantially in the plane of line 5—5, Figure 1. Figure 6 is a fragmentary vertical section taken on line 6—6, Figure 5. Figure 7 is a diagram of the electric circuit of the indicator device.

Similar characters of reference indicate corresponding parts throughout the several views.

In Figure 1 is shown a portion of a shuffle board of ordinary construction having a playing surface 10 surrounded by a gutter 11 and having transverse lines or shallow grooves 12 thereon dividing the same into zones. The playing pieces, known as counters or weights, are indicated by the numeral 13. In the playing of the game friendly disputes arise as to relative positions assumed by the weights and the instrument constituting the subject matter of my invention acts to settle such disputes by indicating, through the medium of a lighted lamp or the like, whether a given weight is over the line, or overhanging the end of the playing surface, or which one of two or more weights is the leading one.

This instrument consists of a comparatively small, light casing 14 of substantially rectangular shape which has an upright portion 15 at one end adapted to be squared against the end of the playing surface when checking a so-called "hanger," as shown in Figure 2, laterally-spaced depending tongues or flanges 16 on the bottom of such adjoining casing-end adapted to register with one of the board-grooves 12 when checking the position of a weight 13 relative thereto, as shown in Figure 5, and depending guide flanges 17 on its bottom for detachable engagement with a T-square 18 or the like, in the manner shown in Figure 4 and at the right side of Figure 1, when checking two or more weights for a lead position. The upright casing-portion 15 is preferably shaped in top plan, as shown in Figure 3, and terminates at its opposite sides in forwardly-facing flanges 19 whose free edges are adapted for abutting engagement with the end of the playing surface of the board, while its top and bottom is recessed, as indicated at 19$^a$, to afford clearance between the casing-wall and the weight being tested for position.

Fitted in the end portion 15 of the casing for longitudinal displacement relative thereto are upper and lower, horizontally-disposed detector pins 20 and 21, respectively, and fitted in the opposite end of the casing adjacent the bottom thereof is a third pin 22. These pins project sufficiently from the respective ends of the casing to make a point contact with the weights when checking them for position, and if the position of a given weight is such as to cause the inward displacement of the companion pin then such displacement selectively initiates the closing of an electric circuit 23 to light a lamp 24 positioned on the top of the casing for ready observation and thereby indicate to the players that the weight so tested is in one or another of the scoring positions heretofore mentioned. On the other hand, if the pin is not so displaced and the lamp circuit is not closed, then the lamp is not lighted and the players are informed that the weight so tested is not in a scoring position.

Included in parallel in the lamp circuit 23 are switches indicated generally by the numerals 25, 26 and 27 which are normally open and which are adapted to be selectively closed when the companion detector pins 20, 21 and 22 are displaced by the weight 13 to a switch-closing position. Each switch includes a vertically-swinging blade element 28 fulcrumed adjacent one end on a horizontal pivot 29 applied to a bracket 30 housed within and insulated from the casing 10, such bracket having an adjusting screw 31 for abutting against the short arm of the switch element to preset the longer contact arm in its proper position. This longer arm normally urges the shorter arm by gravity against the adjusting screw. Companion to the blade element 28 is a pin-actuated, vertically-swinging switch blade element 32 fulcrumed adjacent one end on a horizontal pivot 33 with its shorter pendant arm normally urged by gravity against the companion head end of the detector pin 20, 21 or 22 and the longer contact arm being in operative relation to the corresponding arm of the blade element 28 and normally out of contact therewith, as shown at the lower right hand corner of the casing in Figure 2. When a detector pin is displaced by the weight as shown in Figure 4, the companion blade element 32 is rocked thereby into switch-closing contact with the companion blade element 28 to close that switch circuit to the lamp 24. A stop pin 34 is disposed in the path of the short arm of the blade element 32 to limit its degree of movement as well as that of the detector pin.

A pair of dry cells or batteries 35 removably supported within the casing serves to furnish the current required for the lamp circuit.

While manifestly simple, compact and inexpensive in construction, this indicating instrument for shuffle boards is easy to use and when it comes to settling disputes as to relative positions of the weights or counters it is accurate and can be relied on.

I claim as my invention:

1. An indicator for shuffle boards, comprising a portable casing having an indicating element thereon and having a straight upright edge at one end for abutting engagement against the playing board, upper and lower detector pins movably guided in said casing along its upright edge and adapted for displaceable contact with one or another of the playing weights when the casing is brought into elevational registration therewith, and means in said casing in actuating relation to said detector pins, respectively, for rendering the indicating element operative upon a predetermined displacement of said pins by said weights.

2. An indicator for shuffle boards, comprising a casing, a plurality of detector pins slidably guided on said casing at different points thereof for contact at their outer ends with the periphery of a playing weight, an electric circuit including a lamp adapted to be lighted whenever one or another of said detector pins is displaced inwardly by a playing weight, and a plurality of normally-open switches corresponding in number to said pins included in said circuit, each of the switches including a pivoted element having a portion normally urged in engagement with the inner end of the companion detector pin to displace it outwardly.

3. An indicator for shuffle boards, comprising a casing, a plurality of detector pins slidably guided on said casing at different points thereof for contact at their outer ends with the periphery of a playing weight, an electric circuit including a lamp adapted to be lighted whenever one or another of said detector pins in displaced inwardly by a playing weight, and a plurality of normally-open switches included in said circuit and each including a vertically-swinging blade element having a stop for limiting its movement in one direction and a complemental swinging blade element having a portion normally disposed out of contact with the first-named blade element and a portion in operative relation to a companion detector pin and normally urging it to an outwardly displaced position.

4. An indicator for shuffle boards, comprising a portable casing having an indicating lamp thereon, an electric circuit for the lamp, a plurality of switch means mounted in said casing and included in the lamp circuit for rendering the same selectively operative, each switch means including relatively movable pivoted elements normally seeking a switch-opening position, and a plurality of displaceable pins in correlation to said switch means and freely guided in and projecting from different walls of the casing for initiating contact at their outer ends with one or another of a given positioned playing weight or weights, the inner end of each pin being in constant bearing engagement with and normally projected outwardly by a companion switch element.

5. A shuffle board weight indicating device, comprising a portable casing having an upright portion thereon for squaring it against the end of the playing surface of the board and a portion on its bottom for registering alinement with one or another of the transverse zone lines of the playing board, an indicating element on said casing, a plurality of individually movable means mounted in said casing and operatively connected to said indicating element for rendering the same selectively operative when displaced from their normally inoperative to an operative position, and a plurality of detector pins corresponding in number to said movable means guided on said casing and normally projecting at their outer ends beyond the casing for peripheral contact with a playing weight and in operative relation at their inner ends with the companion individually movable means.

6. A shuffle board weight indicating device, comprising a portable casing having an upright portion thereon for squaring it against the end of the playing surface of the board and a portion on its bottom for registering alinement with one or another of the transverse zone lines of the playing board, a plurality of detector pins movably guided on said casing at different locations thereon and adapted for contact at their outer ends with the periphery of a playing weight, an electric circuit including a lamp on said casing adapted to be lighted whenever one or another of said detector pins is displaced by a playing weight, and a plurality of normally-open switches in the casing corresponding in number to said pins and included in said circuit, one of the elements of each switch being in operative governing relation to the inner end of the companion detector pin.

MERLE J. HARBECK.

REFERENCES CITED

The following references are of record in the file of this patent:

UNITED STATES PATENTS

| Number | Name | Date |
|---|---|---|
| 2,099,896 | Kinzel | Nov. 23, 1937 |
| 2,331,669 | Entriken | Oct. 12, 1943 |
| 2,431,099 | Wiseman et al. | Nov. 18, 1947 |
| 2,433,585 | Warner | Dec. 30, 1947 |